US012664284B1

(12) United States Patent
    Ianelli

(10) Patent No.:    US 12,664,284 B1
(45) Date of Patent:         Jun. 23, 2026

(54) CENTRAL SYSTEM FOR COMPUTER SYSTEM SECURITY ASSESSMENT

(71) Applicant: Qintel, LLC, Pittsburgh, PA (US)

(72) Inventor: Nicholas Raymond Julius Ianelli, Sarasota, FL (US)

(73) Assignee: Qintel, LLC, Pittsburgh, PA (US)

( * ) Notice: Subject to any disclaimer, the term of this patent is extended or adjusted under 35 U.S.C. 154(b) by 223 days.

(21) Appl. No.: 17/825,166

(22) Filed: May 26, 2022

(51) Int. Cl.
    *G06F 21/57*          (2013.01)
    *G06F 21/55*          (2013.01)

(52) U.S. Cl.
    CPC .......... *G06F 21/577* (2013.01); *G06F 21/552* (2013.01); *G06F 2221/034* (2013.01)

(58) Field of Classification Search
    CPC . G06F 21/577; G06F 21/552; G06F 2221/034
    See application file for complete search history.

(56) References Cited

U.S. PATENT DOCUMENTS

| | | | | | |
|---|---|---|---|---|---|
| 7,610,624 | B1 * | 10/2009 | Brothers | ............... | H04L 63/145 |
| | | | | | 709/224 |
| 10,868,825 | B1 * | 12/2020 | Dominessy | ........... | H04L 43/045 |
| 12,001,849 | B1 * | 6/2024 | Shiflett | ................. | G06F 9/3885 |
| 12,028,214 | B1 * | 7/2024 | Geiger | .................... | H04L 67/08 |

| | | | | | |
|---|---|---|---|---|---|
| 2004/0193918 | A1 * | 9/2004 | Green | ................. | H04L 63/1433 |
| | | | | | 726/22 |
| 2006/0149848 | A1 * | 7/2006 | Shay | ....................... | H04L 43/00 |
| | | | | | 709/229 |
| 2013/0298244 | A1 * | 11/2013 | Kumar | .................... | G06F 21/51 |
| | | | | | 726/25 |
| 2015/0121461 | A1 * | 4/2015 | Dulkin | ................ | H04L 63/1408 |
| | | | | | 726/4 |
| 2015/0281278 | A1 * | 10/2015 | Gooding | ................. | H04L 63/20 |
| | | | | | 726/1 |
| 2017/0034023 | A1 * | 2/2017 | Nickolov | ............ | H04L 43/0817 |
| 2017/0169217 | A1 * | 6/2017 | Rahaman | .............. | G06F 21/566 |
| 2019/0238561 | A1 * | 8/2019 | McGloin | .............. | G06F 21/554 |
| 2021/0011821 | A1 * | 1/2021 | Reed | ................... | G06F 11/3055 |

* cited by examiner

*Primary Examiner* — Shirley X Zhang
(74) *Attorney, Agent, or Firm* — FERENCE & ASSOCIATES LLC

(57)                    ABSTRACT

One embodiment provides a method for determining a security status of a target computing system using a central system having a plurality of modules. The central system acquires at least one target system record of a target computing system that is being analyzed for a security status. The central system identifies information of the target computing system by analyzing the at least one target system record. During the analysis the central system generates at least an initial determination regarding the security status of the target computing system. The central system generates a report for the target computing system based upon the information identified. The report provides data regarding the security status of the target computing system. The central system presents, within a dashboard of the central system, at least a portion of the report to a user.

20 Claims, 3 Drawing Sheets

CENTRAL SYSTEM FOR COMPUTER SYSTEM SECURITY ASSESSMENT

BACKGROUND

Computing systems provide many different functions and are an integral part of life, particularly for companies and other entities that need processing capabilities. However, computing systems are vulnerable to misuse and attacks. For example, a malicious actor can attack a system to obtain information contained on the system that is unique to the entity hosting the system. Malicious actors also try to take over systems in order to cause the system to perform actions contrary to the designed purpose of the system, extort companies into paying money to get the system back, disabling and/or sabotaging the system, and the like. As security for systems becomes more sophisticated, attacks carried out by malicious actors also become more sophisticated. Thus, systems are vulnerable to new and ever-changing attacks and the security for the system needs to be frequently reassessed and updated if necessary as identified by the assessment.

BRIEF SUMMARY

In summary, one aspect provides a method for determining a security status of a target computing system, the method including: acquiring, using one of a plurality of modules of a central system, at least one target system record of a target computing system, wherein the target computing system includes a system being analyzed for a security status; identifying, using one of the plurality of modules of the central system, information of the target computing system by analyzing, using one of the plurality of modules of the central system, the at least one target system record, wherein the analyzing includes generating, using one of the plurality of modules of the central system, at least an initial determination regarding the security status of the target computing system; generating, using one of the plurality of modules of the central system, a report for the target computing system based upon the information identified, wherein the report provides data regarding the security status of the target computing system; and presenting, within a dashboard of the central system, at least a portion of the report to a user.

Another aspect provides a central system for determining a security status of a target computing system, the central system including: a dashboard displayable on a display device; a processor operatively coupled to the dashboard and central system; a memory device that stores instructions that, when executed by the processor, causes the system to: acquire, using one of a plurality of modules of the central system, at least one target system record of a target computing system, wherein the target computing system includes a system being analyzed for a security status; identify, using one of the plurality of modules of the central system, information of the target computing system by analyzing, using one of the plurality of modules of the central system, the at least one target system record, wherein the analyzing includes generating, using one of the plurality of modules of the central system, at least an initial determination regarding the security status of the target computing system; generate, using one of the plurality of modules of the central system, a report for the target computing system based upon the information identified, wherein the report provides data regarding the security status of the target computing system; and present, within the dashboard of the central system, at least a portion of the report to a user.

A further aspect provides a product for determining a security status of a target computing system, the product including: a computer-readable storage device that stores executable code that, when executed by a processor, causes the product to: acquire, using one of a plurality of modules of a central system, at least one target system record of a target computing system, wherein the target computing system includes a system being analyzed for a security status; identify, using one of the plurality of modules of the central system, information of the target computing system by analyzing, using one of the plurality of modules of the central system, the at least one target system record, wherein the analyzing includes generating, using one of the plurality of modules of the central system, at least an initial determination regarding the security status of the target computing system; generate, using one of the plurality of modules of the central system, a report for the target computing system based upon the information identified, wherein the report provides data regarding the security status of the target computing system; and present, within a dashboard of the central system, at least a portion of the report to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
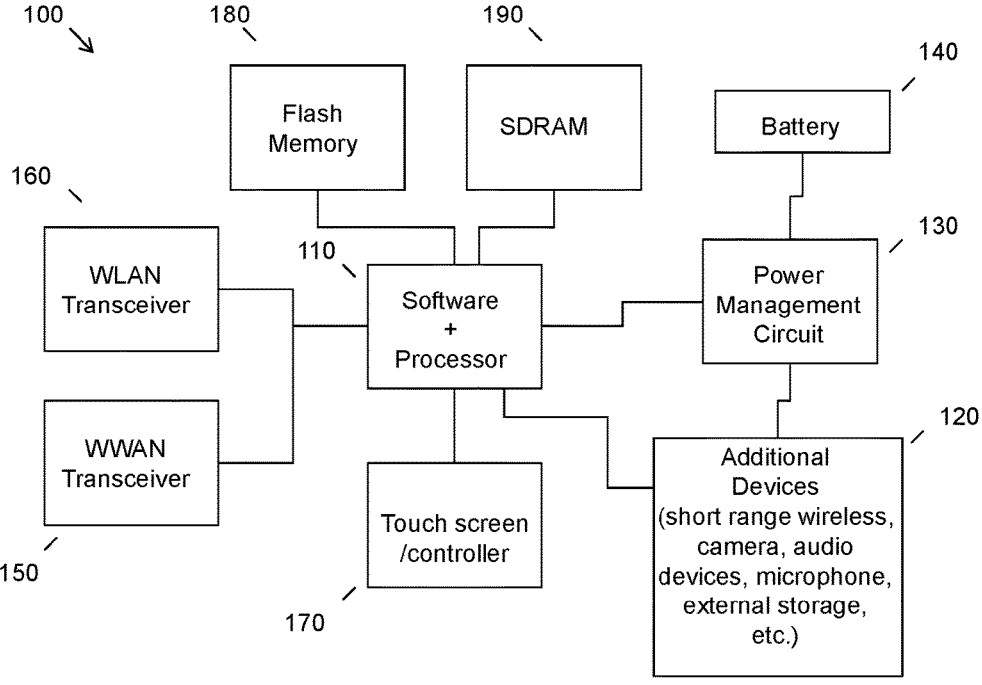
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Since attacks performed by malicious actors are frequently changing and evolving, it is difficult to identify the malicious actors. Further adding to the difficulty is that the Internet has a very large number of possible Internet protocol (IP) addresses and possible protocol implementations. Thus, traditionally, the identification of malicious actors or system vulnerabilities is reactive, very time consuming, and requires highly skilled individuals. However, the ability to learn what systems communicate using which protocols is beneficial and, in some cases, necessary to many different cyber operations, for example, identifying malicious actors, system vulnerabilities, and determining a breadth of attack if a system has been attacked.

Since a forensic analysis of systems is time consuming and systems are frequently changing, it is beneficial to take system records (e.g., disk images, memory, files from a filesystem, etc.) from a target processing system. However, due to an increase in remote work, global scaling, and other factors that cause a company to move towards the virtualization of computing systems and expand the computing system to many different geographically diverse data centers, the ability to obtain forensically sound system records of the target computing system is very time consuming and highly specialized. Additionally, traditional solutions that assist in obtaining these system records do not provide a central management platform that provides the ability to track the activity to ensure that the process is being done and that no errors are occurring during the process. Additionally, the format of the system record is based upon the system of the target computing system. Thus, the system records obtained may be in many different formats which make it difficult to process with a single system.

There are some traditional systems that allow for scanning for protocols on the Internet. However, these systems are programmed to scan for known protocols. Accordingly, these systems do not provide for discovery of proprietary protocols, particularly at a large scale. Additionally, as new protocols are utilized by malicious actors, these systems do not detect them until it is reprogrammed or updated to include these new protocols in the detection system. Thus, these systems end up being fairly reactive, much like the manual techniques.

Additionally, while there are some traditional systems that permit for the remote acquisition of system records, these systems do not perform any additional processing of the system records, for example, converting the system record to a different format that is processable by an analysis system. Traditionally, analysis of a target system records is a manual process that requires skilled individuals to analyze the system records. While some portions may be programmed to be performed by a processing system, the process still is highly manual. There are a few analysis programs that do static and runtime analysis on files, meaning the file is run on a sequestered system and the system is monitored for changes. However, while the analysis may be performed by a system, setting up the analysis is very manual and has to be performed for every single file or group of files, making it still very time consuming and labor intensive.

Accordingly, the described system and method provides a technique for determining a security status of a target computing system. The security status may be a determination of whether the system is malicious, vulnerable, compromised, or the like. The system includes a central system, also referred to as a central management platform, that includes a plurality of modules. Each of the modules may be programmed to perform a particular task of the security assessment process. One or more of the modules may be programmed to acquire a system record (e.g., disk image, memory, file, etc.) of a target computing system. The target computing system is a computing system of interest, or, in other words, the computing system that is being analyzed or assess for a security status. The system can perform file introspection where the filesystem is accessed to find desired files for analysis.

One or more modules analyzes the target system records to identify information of the target computing system. The information is any information that may be useful in determining a security status of the target computing system. For example, the information may include identification of IP addresses that have accessed the system, applications that are running or scheduled to run on the system, the number and/or types of connections to the system, and the like. From this information, the system can make an initial determination regarding the security status of the target computing system. This initial determination and the identified information are used to generate a report for the target computing system. The information contained within the report provides data regarding the security status of the target computing system. In other words, based upon the initial determination, the system identifies what data from the identified information should be included in the report. At least a portion of the report is then presented to a user within a dashboard of the central system.

Therefore, a system provides a technical improvement over traditional methods for computing system security assessment. Unlike traditional web-based scanning systems, the described system and method provides a central management platform that not only identifies known protocols, but is also able to discover proprietary protocols at scale. Additionally, the central management platform includes at least one module that can accept system records having different formats and convert the system records to a standard format of the central management platform. Additionally, unlike traditional systems, the central management platform can perform at least the analysis of the target system records and generation of a report providing details of the analysis in an automated fashion which substantially reduces the amount of time that a user has to be involved in the process of assessing a security status of a computing system. Thus, the described system and method provides a technique that reduces the time and manual labor needed to identifying a security status of a computing system as compared to the traditional manual and time intensive techniques. Additionally, the described system and method provides a system that is more proactive than the traditional systems with the ability to discover new protocols during the analysis.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110.

Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
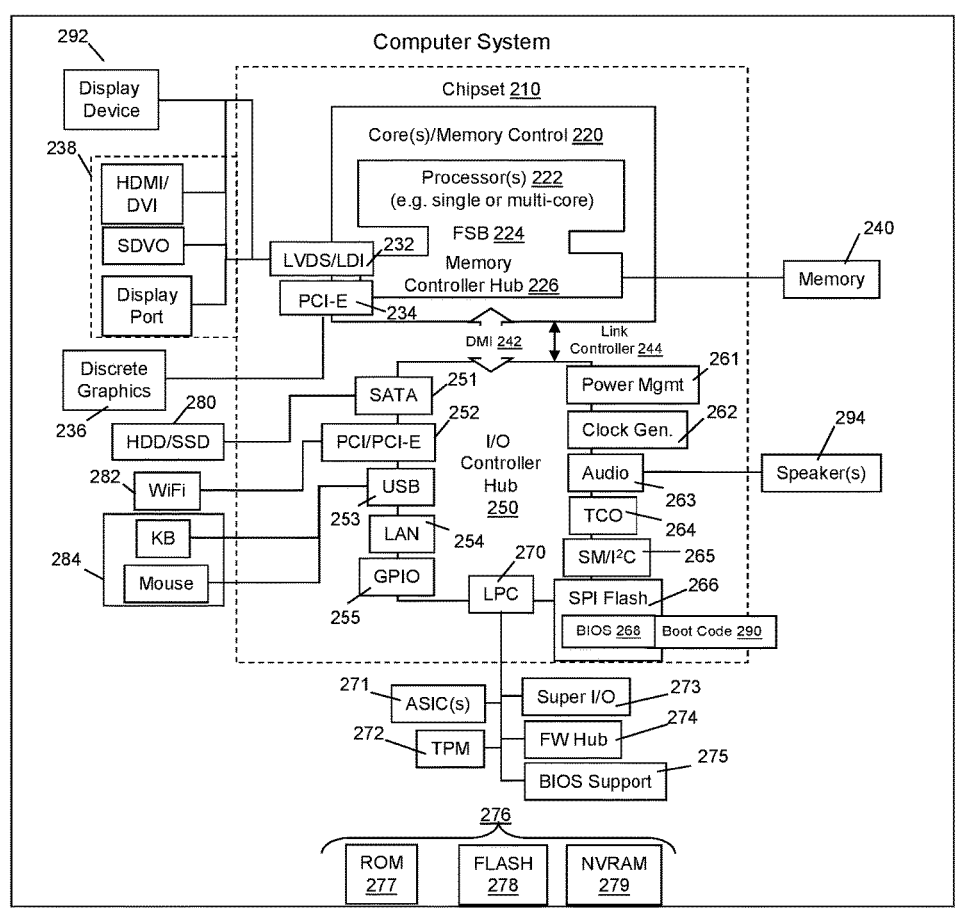
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for computing system security assessment as described herein and/or in target computing systems being assessed for security. For example, the circuitry outlined in FIG. 1 may be implemented in a tablet or smart phone embodiment, whereas the circuitry outlined in FIG. 2 may be implemented in a personal computer embodiment.

Figure 3:
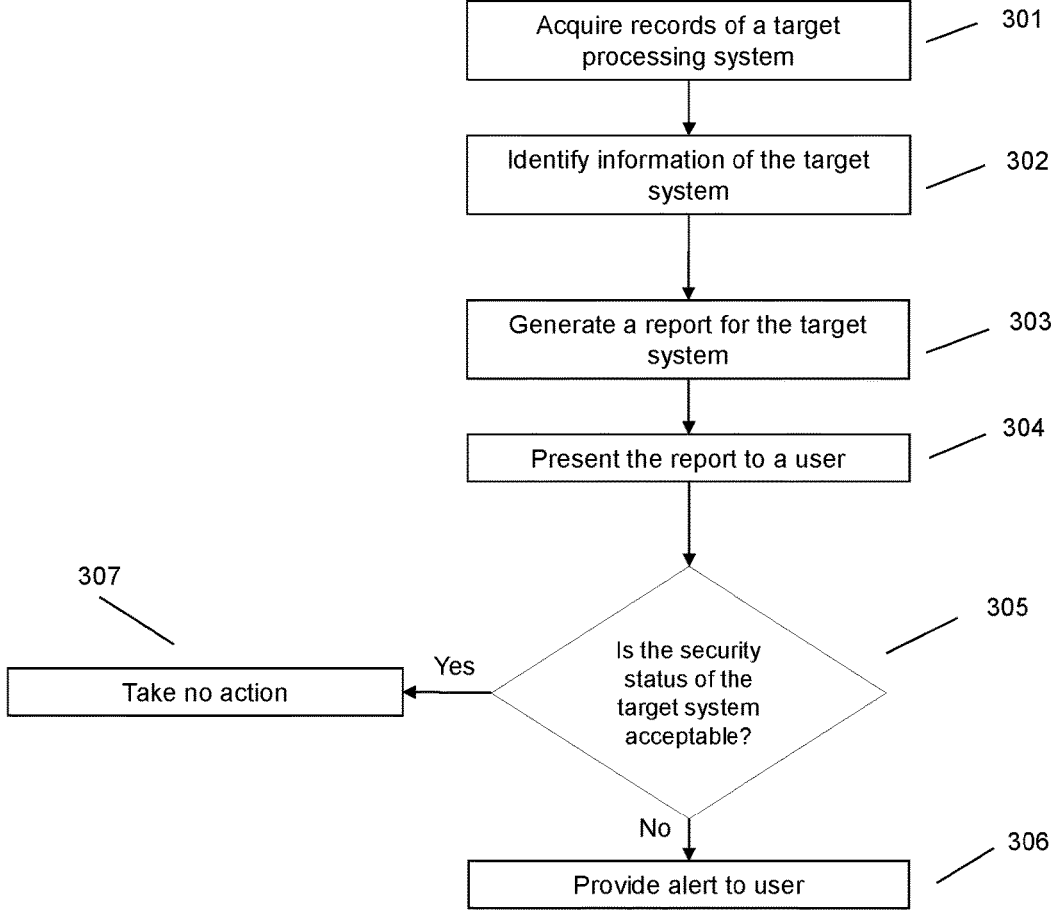
FIG. 3 illustrates an example method for determining a security status of a target computing system utilizing a central system having a plurality of modules.

FIG. 3 illustrates an example method for determining a security status of a target computing system utilizing a central system having a plurality of modules. The method may be implemented on a central system which includes a processor, memory device, output devices (e.g., display device, printer, etc.), input devices (e.g., keyboard, touch screen, mouse, microphones, sensors, biometric scanners, etc.), and/or other components, for example, those discussed in connection with FIG. 1 and/or FIG. 2. While the central system may include known hardware and software components and/or hardware and software components developed in the future, the system itself is specifically programmed to perform the functions as described herein to perform computing system security assessments. Additionally, the central system includes modules and features that are unique to the described system.

The central system is a central management platform that includes a plurality of different modules. One or more of the modules may communicate with the central system through an application programming interface (API). One or more of the modules may be stored or run within a cloud environment, remote network environment, local network, or the like. Each of the modules is programmed to perform a function of the security assessment process. It should be noted that multiple modules may be programmed to perform the same function. The central management platform is the underlying system that provides instructions to each of the modules. The central management platform provides a central place to organize the entirety of the security assessment process and also provides a dashboard or graphical user interface for user interaction. The dashboard not only allows a user to see a status of the assessment process for one or more jobs, but also allows the user to provide input to the system. The user can provide input to create an assessment job, provide queries for searches to be performed on obtained data, provide queries for searches to be performed on analyzed data, select information contained within the central system, and the like.

Since the central system has access to significant amounts of data of a target computing system, including the raw data, analyses performed on the target system, and reports generated for the target system, the central system can automatically identify correlations between different information of the target computing system. The system can also automatically identify correlations between the target computing system and other systems that have been collected or that are included in or accessible by the central system. Additionally, as new information is obtained or accessible by the central system, new correlations for "old" systems (or systems already included in or accessible by the central system) can be made against the new information. Additionally, as correlations are identified, either within a target system or across information contained within or accessible by the central system, the central system may update records so that all analyzed systems have a record of the correlation.

The correlations may be simple correlations, for example, a specific host accessed a system at a particular time and then accessed the same system at a different time or more complex correlations, for example, systems having these attributes were previously identified as malicious and a new system having similar attributes but not yet identified as malicious is now accessing the system. The central system may utilize machine-learning models in identifying correlations between information accessible by the central system.

In addition to automatic correlations, the central system can also perform other automated tasks. Specifically, since the central management platform provides instructions to all of the modules, the performance of the assessments jobs is an automated process during at least the identification of information and generation of the report steps. If an agent of the central system is located on the target computing system, then both the identification and acquiring step can also be automated. These steps will be discussed in further detail herein.

Within the dashboard the user can provide input to create or start a security assessment job. The dashboard may include a point-and-click user interface that allows the user to select job parameters and/or create custom jobs. It should be noted that a user does not have to set a job for every possible scenario. Rather, some jobs may be automated based upon different parameters that have been set or through training of the central system. For example, a user may have set parameters that indicate if the system identifies a new malicious controller, then the central system will automatically get one or more target system records without a user to have to set up a job to get the system records. Other examples include jobs that are set up to run on a periodic basis, jobs that are set up based upon a security status of a target system, and the like. As an example, if a target system is identified as vulnerable, the central system may then automatically perform functions to ascertain if the target system has been compromised, without a user having to manually set jobs to perform each of the functions.

Job creation, including custom job creation, may be set up by a user using a point-and-click interface, simple form field interface, or the like. To decrease the likelihood of providing conflicting parameters for jobs or selecting conflicting functions for a job, the job creation interface may be set like an advanced search where the user is only presented with options that are based upon previously selected options or choices. For example, if a user selects a particular radio button in the interface, selection of that button may cause other selections to appear. These selections would be compatible with the previously selected button. If a user were to select a different radio button, then the selections that would appear would be different than the selections possible under the first radio button. Thus, if a subsequent job function or option is not compatible with a previously selected option, that job function or option would not be presented to the user. In some cases, the user may want to create a job that is not possible to be created using the point-and-click interface. In this case, the user could access a different section of the dashboard that would allow more advanced job creation features. In order to prevent users from setting up jobs incorrectly, this different section may require user credentials that are then matched to a set of authorized users.

Generally, the first step of an assessment job is identifying a target computing system. Thus, one or more of the modules of the central system may be programmed to identify a target computing system. A module for identifying a target computing system is described in commonly-owned application having Ser. No. 17/825,633, entitled "DISCOVERING COMPUTING ENTITIES COMMUNICATING WITH A NETWORK COMMUNICATION PROTOCOL" and filed on May 26, 2022, the contents of which are incorporated by reference herein as if set forth fully herein. A target computing system is a computing system that is being analyzed for a security status. A security status indicates a function of the computing system and/or a breach status of the computing system. Example functions of the computing system include, but are not limited to, a malicious system, a nefarious system, a vulnerable system, and the like. Example breach statuses include, but are not limited to, breached, an extent of a breach, exfiltrated data, a combination thereof, and/or the like. To identify a security status of the target computing system, the central system may scan or survey a system at large, for example, the Internet, a corporate network, a hosting system, or the like.

It should be noted that while it is described that the central system performs any of the functions described herein, the central system itself generally provides instructions to one or more of a plurality of modules coupled to the central system to perform the described function. For example, the scanning function is performed by one or more of the modules of the central system responsive to receiving instructions from the central system to perform the scanning. Other functions discussed herein may be performed in a similar fashion using different modules.

To identify a security status of the target computing system, the central system may scan ports, applications, interfaces, or other system or software components for indicators that an infrastructure or host that is accessing, communicating with, running a program or application on the target system is of interest to the central system. The central system has intelligence about protocols, malware, software vulnerabilities, and the like, that are indicative of a specific security status. Thus, during the scanning, the central system scans for indicators that are indicative of the protocols, malware, software vulnerabilities, and the like, that indicate that the target system may have a particular security status that is of interest to the central system. For example, the scanning may indicate that an infrastructure or host is listening on a specific port and is performing or engaging in a kind of interaction that can be validated as being of interest.

One technique for determining if an interaction, infrastructure or host, application, or the like, is of interest is to identify different characteristics of the interaction. If the interaction has one or more characteristics that have been identified as indicative characteristics (i.e., characteristics that have been identified as characteristics that provide indicators regarding a security status), the central system may determine that the interaction is of interest. The system may also compare the indicative characteristics to a threshold to determine if the interaction is of interest. For example, the central system may determine that a particular number of indicative characteristics make the interaction interesting, a particular value of indicative characteristics make the interaction interesting, and the like.

Additionally, or alternatively, a particular type of interaction may make the interaction interesting. Interaction types may identify how the infrastructure or host is interacting with the target computing system. Example interaction types include accessing data, obtaining data, querying data, duplicating data, installing data or applications, and the like. Additionally, or alternatively, a location of the interaction may make the interaction interesting. The location of the interaction designates an origin or end point of the interaction. For example, if the interaction originates from a particular geographical location, on a particular port of the target system, on a particular application of the target system, or the like, the interaction may be of interest. Similarly, if the interaction end point is at a particular application, a particular port, a particular system component, or the like, the interaction may be of interest.

At 301 at least one of the modules of the central system is used to acquire a target system record (e.g., disk image, memory, files identified from a filesystem, etc.) of the target system that is being analyzed for a security status. The central system includes a server and client architecture that is purpose built for collecting target system records from systems. The client, also referred to as an agent, may be installed on or otherwise located on the target system. If the client is installed on the target system, then the central system can provide instructions to the client to obtain target system records of the target system. In this case, a user would not have to manually provide instructions to acquire the target system records or manually access the target system to obtain the target system records.

As an example, if the client is running on a hosting provider that runs multiple virtualized operating systems on one machine, the client allows access to all of those virtualized machines. Similarly, in a corporate environment the client could run on a virtual machine server which would allow access to all the virtual machines or virtualized individual host machines. Thus, using the server and client architecture would allow the central system to be able to display an inventory of what is available to collect through the server and client architecture, for example, in a dashboard. A user could then just provide input identifying the target system records to collect and the central system could provide instructions to collect the identified target system records.

In the event that the target system does not have the client running on it, a user can manually request the target system records, for example, by accessing the target system and obtaining the target system records. Some of this may be automated by the central system. For example, even if the agent is not running on a target system, when the user creates a job to assess the target system, the central system may notify the job creation user that the target system records will have to be manually obtained. The central system may also automatically send a notification to the owner of the target system that target system records are needed and that an assessment job was requested or created.

Since different target computing systems are run on different providers, the target system records that are acquired may be in different formats. In other words, the raw target system records that are acquired may be in different formats based upon the provider. Thus, the central system may include a module that converts the target system record from the format of the provider into a standard format of the central system. Thus, the central system can interface with any number of disparate systems and still utilize the target system records of those systems. Additionally, this module enables remote retrieval of all of the target system records in different formats. If an owner of a target system wants to make a remote target system record available to the central system, a user can program the module to acquire and convert the target system records into the standard format instead of a user having to manually perform these tasks.

At 302, one or more of the modules of the central system are utilized to identify information of the target system by analyzing the target system records. The analysis includes generating at least an initial determination regarding the security status of the target system. Therefore, the information that is identified is information that is pertinent to the security status of the target computing system. Analyzing the target system records of the target computing system may include utilizing a modular platform where each module performs a different function. For example, one module of the modular platform may analyze batch history, another module may identify connection types, another module may identify the types of applications that are currently running and that are set to start up, another module may identify information about systems accessing the target system, and the like. Stated differently, the analysis function analyzes artefacts on the target system records to make at least an initial determination regarding a security status of the target computing system. This modular platform is used to automate forensic investigation processes so that the central system can automatically generate or identify information that is of interest, for example, based upon historical analyses, based upon information that has been programmed as being of interest, and the like. A modular platform for processing and analyzing data is described in commonly-owned application having Ser. No. 17/825,475, entitled "DISTRIBUTED AND PARALLEL PROCESSING OF DATA" and filed on May 26, 2022, the contents of which are incorporated by reference herein as if set forth fully herein.

Using the analyses of the modular platform, or any other analysis tool or technique, the central system can not only identify information of interest and relevant to the security status of the target computing system, but can also learn information that may become of interest. To learn information that may become of interest, the central system may employ one or more machine learning models. These models may be initially trained using one or more training datasets that identify correlations between obtained information and information of interest. As the machine-learning models are utilized and deployed, information that is deemed to be of interest may be automatically ingested by the model(s) in order to further refine the model(s) and improve the accuracy of the model(s). Not only can machine-learning models be utilized in the performance of the analysis functions, but other machine-learning models can be used in the performance of other functions, for example, identifying a target computing system, report generation functions, and the like.

From the identified information and analysis, the central system makes an initial determination regarding the security status of the target computing system. The initial determination regarding the security status of the target computing system may include categorizing the target computing system, for example, the system is vulnerable, the system is compromised, the system is malicious, and/or the like. Additionally, the initial determination may include an explanation explaining why the target system was categorized as it was. For example, if the target system includes a particular application or application version that makes the target system vulnerable, the explanation may identify that application and/or application version. As another example, if the target system has had information copied and transmitted to another location, the explanation may provide this information.

At 303, the central system generates, using one of the modules, a report for the target system based upon the identified information and the initial determination made at 302. The report includes data regarding the security status of the target system. In other words, the report may only include the information or data that is pertinent to the security status of the target system. The system may also generate multiple reports based upon the identified information. One report may be a high-level report that provides a brief overview of the information. Another report may be a more detailed report that provides all of the identified information, more detailed explanations, and/or the like. The high-level report may be initially provided to a user so that the user can get a sense of what is going on with a target system. High-level reports may be useful for prioritizing analysis jobs performed by one or more users. The central system may also prioritize the analysis jobs performed by one or more users using one or more criteria. For example, the system may prioritize an analysis job that indicates a system was compromised over an analysis job that indicates a system is merely vulnerable but has not yet been compromised.

The reports, either high-level, more detailed, or any other reports, may be provided in the dashboard of the central system. In other words, the central system may present at least a portion of the report to a user within the dashboard at 304. The dashboard may also provide the user with the ability to access additional information associated with the report, for example, a more detailed report, more detailed analysis, underlying data, and/or the like. Since the central system has access to all the raw data, analyses, and reporting, the dashboard may also provide search functions. This allows the user to provide query input to the dashboard and the central system can search the relevant information utilizing the query input. For example, if a query is for information that would be included in the raw data, the central system can search the raw data instead of all of the accessible data. Similarly, if a query is for information of a particular target system, the central system may only search the information related to the identified target system. The user may provide search criteria in a search field, in an advanced search field, by selecting data presented in the dashboard like data of the report(s), and the like.

At 305, the central system, or a user, may determine if the security status of the target system is acceptable. This determination may be made by the central based upon the initial determination regarding the security status of the target system. For example, the central system may be programmed such that initial determinations meeting particular criteria are deemed acceptable, whereas initial determinations meeting different criteria are deemed unacceptable. A user may also provide an indication regarding whether the security status is acceptable. If the security status is acceptable, the central system may take no further action with regarding to notifying a user at 307.

If, on the other hand, the central system determines the security status is not acceptable, the central system may provide an alert to the user at 306. The user may set up the parameters for an alert or notification. Additionally, or alternatively, the alerts or notifications may be default alerts or notifications. Additionally, the alerts and notifications can be set up to run retroactively against old data and also automatically on any new data that comes in. The alert may be a simple alert that indicates a job needs additional input from a user or may include more details that provides some context to the user. The alerts or notifications may be push notifications, notifications that are presented when a user logs into the central system, a combination thereof, or the like.

Additionally, or alternatively, the alerts or notifications may be pushed to or integrated into one or more other systems or workflows. For example, the central system may create or interface with a workflow management system that can generate workflow tickets. Thus, when providing a notification, the central system may send a notification to the workflow management system which may in turn generate a workflow ticket corresponding to the notification, for example, if a user needs to provide additional input. The workflow management system may store the notification as a workflow status and when a user logs into the workflow management system, the user can be apprised of the status. The workflow management system may also send a notification to a user based upon different features of the workflow management system.

The central system automates as much of the security assessment process as possible in a centrally managed location. For example, if an agent is running on a target computing system, central system can automatically acquire the target system records, automatically analyze the target system records and make an initial security status determination, and automatically generate a report to present to a user. Additionally, in some case, identification of the target system may also be automated. In the event that an agent is not running on the target system, then at least the analysis, including identifying the information of the target system, and report generation steps can be automated. The central system can also automate other functions. For example, in the event that a user creates a custom job, the central system identifies the portions of that custom job that can be automated and then automates those steps. Thus, the central system reduces the amount of time and manual input that is needed by one or more users.

Additionally, since the central system has access to all the raw data, retroactive analyses can be performed on the data. As an example, if new protocols or malicious actor indicators are identified, the central system can perform analyses for the new protocols or malicious actors on not only newly acquired target system records, but also on the stored data that was previously captured. The central system includes a data store where all the information is stored, including the raw data, analysis data, analysis conclusions, reports, and the like. A technique for identifying and storing data and relationships between data is described in commonly-owned application having Ser. No. 17/825,716, entitled "GENERATION AND STORAGE OF DATA RELATIONSHIPS" and filed on May 26, 2022, the contents of which are incorporated by reference herein as if set forth fully herein. The data store, or other module, stores a current status of a job and any errors that are found. The dashboard allows the user to access the current status and view any of the errors that are associated with the job. A high-level overview of an error may be initially presented, and more detailed information regarding the error may be presented when the user hovers over the error, selects the error, or the like. The user can also access the log file which would include most of the details of the error(s). These log files would also be stored in the data store for later access.

The dashboard may provide additional functions. For example, since the central system can perform automatic correlations, as discussed further herein, the dashboard may provide functions that allow a user to set notifications or alerts based upon the correlations. The user may set parameters or thresholds that indicate if a particular correlation meets the parameters or threshold, then a notification or alert should be provided to the user. As an example, the user may set parameters that if a correlation indicates that a particular system accesses a particular port more than once, an alert should be generated. As another example, the user may set parameters that if a correlation indicates an access to the target system originates from a particular geographic region, an alert should be generated.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for determining a security status of a target computing system, the method comprising:

acquiring, using one of a plurality of modules of a central system, at least one target system record of a target computing system, wherein the target computing system comprises a system being analyzed for an overall security status;

scanning system components of the target computing system to identify a host that is accessing the target computing system and that is of interest based upon a network protocol of the host, wherein identifying that the host is of interest comprises identifying, during the scanning, indicators that indicate the host has a security status that is of interest based upon characteristics of interactions of the host with the target computing system;

identifying, using one of the plurality of modules of the central system, information of the target computing system pertinent to the overall security status of the target computing system by analyzing, using one of the plurality of modules of the central system, the at least one target system record, wherein the analyzing comprises generating, using one of the plurality of modules of the central system and based upon the at least one target system record and the scanning, at least an initial determination regarding the overall security status of the target computing system, wherein the generating the at least an initial determination comprises categorizing the target computing system and providing an explanation explaining the categorizing;

generating, using one of the plurality of modules of the central system, a report for the target computing system based upon the information identified, wherein the report provides data regarding the overall security status of the target computing system; and presenting, within a dashboard of the central system, at least a portion of the report to a user.

2. The method of claim 1, wherein the acquiring comprises converting the at least one target system record into a format processable by the central system.

3. The method of claim 1, wherein the acquiring further comprises acquiring memory of the target computing system.

4. The method of claim 1, wherein the acquiring comprises utilizing a server and client architecture located at the target computing system.

5. The method of claim 1, wherein the analyzing comprises utilizing a modular platform of the central system, wherein each module of the modular platform analyzes different information of the at least one target system record.

6. The method of claim 1, wherein the identifying and generating are performed without additional user input by the central system responsive to receiving job instructions from a user.

7. The method of claim 1, further comprising identifying, without user input, correlations based upon the information.

8. The method of claim 7, further comprising generating notifications to a user based upon parameters related to the correlations.

9. The method of claim 1, further comprising returning search results from the information identified responsive to receiving information search criteria from a user.

10. The method of claim 1, further comprising storing, within the central system, a current status of a job and errors identified by the central system.

11. A central system for determining a security status of a target computing system, the central system comprising:

a dashboard displayable on a display device;

a processor operatively coupled to the dashboard and central system;

a memory device that stores instructions that, when executed by the processor, causes the system to:

acquire, using one of a plurality of modules of the central system, at least one target system record of a target computing system, wherein the target computing system comprises a system being analyzed for an overall security status;

scan system components of the target computing system to identify a host that is accessing the target computing system and that is of interest based upon a network system and that is of interest based upon a network protocol of the host, wherein identifying that the host is of interest comprises identifying, during the scanning, indicators that indicate the host has a security status that is of interest based upon characteristics of interactions of the host with the target computing system;

identify, using one of the plurality of modules of the central system, information of the target computing system pertinent to the overall security status of the target computing system by analyzing, using one of the plurality of modules of the central system and based upon the at least one target system record and the scanning, the at least one target system record, wherein the analyzing comprises generating, using one of the plurality of modules of the central system, at least an initial determination regarding the overall security status of the target computing system, wherein the generating the at least an initial determination comprises categorizing the target computing system and providing an explanation explaining the categorizing;

generate, using one of the plurality of modules of the central system, a report for the target computing system based upon the information identified, wherein the report provides data regarding the overall security status of the target computing system; and present, within the dashboard of the central system, at least a portion of the report to a user.

12. The central system of claim 11, wherein the acquiring comprises converting the at least one target system record into a format processable by the central system.

13. The central system of claim 11, wherein the acquiring further comprises acquiring memory of the target processing central system.

14. The central system of claim 11, wherein the acquiring comprises utilizing a server and client architecture located at the target processing central system.

15. The central system of claim 11, wherein the analyzing comprises utilizing a modular platform of the central system, wherein each module of the modular platform analyzes different information of the at least one target system record.

16. The central system of claim 11, wherein the identifying and generating are performed without additional user input by the central system responsive to receiving job instructions from a user.

17. The central system of claim 11, further comprising identifying, without user input, correlations based upon the information.

18. The central system of claim 17, further comprising generating notifications to a user based upon parameters related to the correlations.

19. The central system of claim 11, further comprising returning search results from the information identified responsive to receiving information search criteria from a user.

20. A product for determining a security status of a target computing system, the product comprising:

a computer-readable storage device that stores executable code that, when executed by a processor, causes the product to:

acquire, using one of a plurality of modules of a central system, at least one target system record of a target computing system, wherein the target computing system comprises a system being analyzed for an overall security status;

scan system components of the target computing system to identify a host that is accessing the target computing system and that is of interest based upon a network protocol of the host, wherein identifying that the host is of interest comprises identifying, during the scanning, indicators that indicate the host has a security status that is of interest based upon characteristics of inter-actions of the host with the target computing system;

identify, using one of the plurality of modules of the central system, information of the target computing system pertinent to the overall security status of the target computing system by analyzing, using one of the plurality of modules of the central system, the at least one target system record, wherein the analyzing com-prises generating, using one of the plurality of modules of the central system and based upon the at least one target system record and the scanning, at least an initial determination regarding the overall security status of the target computing system, wherein the generating the at least an initial determination comprises catego-rizing the target computing system and providing an explanation explaining the categorizing;

generate, using one of the plurality of modules of the central system, a report for the target computing system based upon the information identified, wherein the report provides data regarding the overall security status of the target computing system; and present, within a dashboard of the central system, at least a portion of the report to a user.

* * * * *